(12) United States Patent
Williams

(10) Patent No.: US 8,766,682 B2
(45) Date of Patent: Jul. 1, 2014

(54) METHOD AND DEVICE FOR MEASURING DURATION OF A TIME INTERVAL

(71) Applicant: Voxtel, Inc., Beaverton, OR (US)

(72) Inventor: George W. Williams, Beaverton, OR (US)

(73) Assignee: Voxtel, Inc., Beaverton, OR (US)

( * ) Notice: Subject to any disclaimer, the term of this patent is extended or adjusted under 35 U.S.C. 154(b) by 0 days.

(21) Appl. No.: 13/749,507

(22) Filed: Jan. 24, 2013

(65) Prior Publication Data

US 2013/0188766 A1  Jul. 25, 2013

Related U.S. Application Data

(60) Provisional application No. 61/589,980, filed on Jan. 24, 2012.

(51) Int. Cl.
*H03L 7/06* (2006.01)

(52) U.S. Cl.
USPC ........... 327/156; 327/160; 327/164; 327/147; 327/149

(58) Field of Classification Search
USPC .............. 327/141, 144–163; 331/1/A, 15–17; 375/373–376
See application file for complete search history.

(56) References Cited

U.S. PATENT DOCUMENTS

| | | | | |
|---|---|---|---|---|
| 5,568,071 A * | 10/1996 | Hoshino et al. | ................. | 377/43 |
| 6,661,266 B1 * | 12/2003 | Variyam et al. | ............... | 327/159 |
| 6,937,106 B2 * | 8/2005 | Chang et al. | .................... | 331/44 |
| 7,332,973 B2 * | 2/2008 | Lee et al. | ......................... | 331/25 |
| 7,403,054 B1 * | 7/2008 | Malladi et al. | ................ | 327/158 |
| 7,616,708 B2 * | 11/2009 | Chen et al. | ..................... | 375/326 |
| 7,667,625 B2 * | 2/2010 | Prodic et al. | .................... | 341/50 |
| 7,812,644 B2 * | 10/2010 | Cha et al. | .......................... | 327/3 |
| 7,932,848 B2 * | 4/2011 | Watanabe | ..................... | 341/157 |
| 8,005,181 B1 * | 8/2011 | Steiner | ............................ | 375/373 |
| 8,269,534 B2 * | 9/2012 | Kim | ................................ | 327/158 |
| 8,593,327 B2 * | 11/2013 | Hagihara | ....................... | 341/169 |
| 2003/0098731 A1 * | 5/2003 | Tabatabaei et al. | ........... | 327/160 |
| 2005/0280458 A1 * | 12/2005 | Leung et al. | .................. | 327/172 |
| 2006/0066368 A1 * | 3/2006 | Gabato et al. | ................. | 327/158 |
| 2007/0195876 A1 * | 8/2007 | Prodic | ........................... | 375/238 |
| 2011/0221409 A1 * | 9/2011 | Nakamura et al. | ............ | 323/272 |
| 2011/0298512 A1 * | 12/2011 | Kwak | ............................ | 327/161 |
| 2012/0194798 A1 | 8/2012 | Crawford et al. | | |

OTHER PUBLICATIONS

Sumi Kurtti and Juha Kostamovaara, An Integrated Laser Receiver Channel Utilizing a Time-Domain Walk Error Compensation Scheme, IEEE Transactions on Instrumentation and Measurement, vol. 60, No. 1, Jan. 2011.

* cited by examiner

*Primary Examiner* — Brandon S Cole

(74) *Attorney, Agent, or Firm* — Chernoff Vilhauer McClung & Stenzel, LLP

(57) ABSTRACT

A method and apparatus for measuring the duration of a transient signal with high precision.

21 Claims, 2 Drawing Sheets

METHOD AND DEVICE FOR MEASURING DURATION OF A TIME INTERVAL

CROSS-REFERENCE TO RELATED APPLICATION

This application claims benefit of U.S. Provisional Application No. 61/589,980 filed Jan. 24, 2012, the entire disclosure of which is hereby incorporated herein by reference for all purposes.

BACKGROUND

A conventional "laser radar" can determine the distance to an object by measuring the time between the sending of a pulse of light and the receipt of a reflection of the pulse from the object. By comparing two or more distance measurements, a speed can also be established by noting the change in distance over time. Conventional laser radar applications only check for the leading edge of the reflected pulse to establish time of flight. However, if the pulse shape and amplitude are known, then additional information, such as the size, orientation, and direction of movement of the object may be deduced. Furthermore, because weak pulses will trigger a detector looking only for a leading edge at a later time than a strong pulse from a target at the same distance, knowledge of pulse amplitude can improve distance measurement precision.

One option for gathering this information is fast analog waveform sampling, which can be accomplished at a rate on the order of a few gigasamples per second (GSa/s). While this has the advantage of gathering a wealth of data which may be extensively processed and analyzed, it requires considerable computing power and storage space, and may present challenges where sub-nanosecond timing resolution is required over numerous channels. Very narrow pulses can also result in aliasing when they fall between scheduled measurements.

An alternative means of extracting data is the Time Over Threshold (TOT) approach. This method collects two data points per pulse: what time a pulse rises above a threshold, and what time it drops below again. A TOT measurement thus establishes the width of a pulse at a preselected level. Furthermore, when pulse shapes are relatively predictable, TOT techniques can give a good approximation of amplitude. Higher resolutions can be achieved by setting multiple thresholds on different channels and recording a time for each crossing. This can provide useful information about pulse amplitude, total energy, and the like even when the shape is somewhat unpredictable. A relatively small number of thresholds—as few as 4—can provide total pulse energy with an accuracy of a few percent. It has also been found that in some applications 8 thresholds (for a total of 16 data points) can provide total pulse energy at an accuracy substantially indistinguishable from analog sampling with thousands of points. With TOT, the waveform itself determines when data points are collected, eliminating aliasing.

However, TOT techniques require high time resolution to be useful. When time is measured using a system clock on an integrated circuit or microprocessor, a high clock speed is therefore advantageous. However, even very fast clocks may not offer the level of resolution desired, and merely increasing clock speed is an expensive way to increase resolution.

SUMMARY

According to a first aspect of the subject matter disclosed herein, there is provided a method of measuring the duration of a time interval between a starting event and an ending event, comprising receiving a periodic sequence of clock transitions, propagating each clock transition through a delay line comprising a plurality of delay units connected in series, wherein each delay unit has an input and an output, wherein the input of a first delay unit receives the clock transition, and the input of each subsequent delay unit is connected to the output of a previous delay unit, and wherein a transition occurs at the output of each delay unit at a fixed delay after the receipt of a transition at the input of that unit, commencing counting the received clock transitions in response to the starting event, and latching the count of received clock transitions and the outputs of the delay units in response to the ending event.

According to a second aspect of the subject matter disclosed herein, there is provided a device for measuring the duration of a time interval between a starting event and an ending event, comprising a clock generator for generating a clock signal having a periodic sequence of clock transitions, a delay line comprising a plurality of delay units connected in series, wherein each delay unit has an input and an output, wherein the input of a first delay unit receives the clock transition, and the input of each subsequent delay unit is connected to the output of a previous delay unit, and wherein a transition occurs at the output of each delay unit at a fixed delay after the receipt of a transition at the input of that unit, a counter that is connected to receive the clock signal and is responsive to the starting event to commence counting the received clock transitions, and a latch that is responsive to the ending event to latch the count of received clock transitions and the outputs of the delay units.

DETAILED DESCRIPTION

Time Over Threshold (TOT) processing may be used to gather information in various different contexts where capturing a detailed picture of an incoming signal is difficult. For example, it can be used in particle physics to gather information about very rapid collision or decay events. In such a case, the total energy of the pulse collected by the sensor is related to the energy of the particle detected. It can also be used in laser radar applications to extract information about an object which has reflected a pulse of light back to the detector. Larger objects will result in a greater reflected energy, while objects with depth may result in broader reflected pulses because different parts of the object return the pulse at different times. Modulated pulses or trains of pulses varying in duty cycle, frequency, phase, or amplitude may be designed to extract as much information as possible from a target.

TOT processing is particularly useful when a high degree of time resolution can be achieved. Small uncertainties in pulse width can mean large uncertainties in amplitude and total energy of the pulse, especially for pulses with nonlinear shapes such as exponential decay. One solution is to simply increase clock speed in a measuring device, thereby giving improved resolution, but doing so increases the cost of the final system. Instead, it is possible to use the clock for the rough timing measurement and a tapped delay line for the fine part of the measurement.

A laser radar unit includes a laser diode that emits a laser pulse towards a region of interest in response to an edge of a drive pulse. Preferably, the edge of the drive pulse also triggers a pulse in a reset signal 16. The laser pulse is incident on an object in the region of interest and light reflected from the object is received at the laser radar unit as reflected pulse 18. A clock generator 9 generates a clock transition 10 at regular intervals, which may be used to measure the time between the sending of the laser pulse and the return of the reflected pulse 18.

Figure 1:
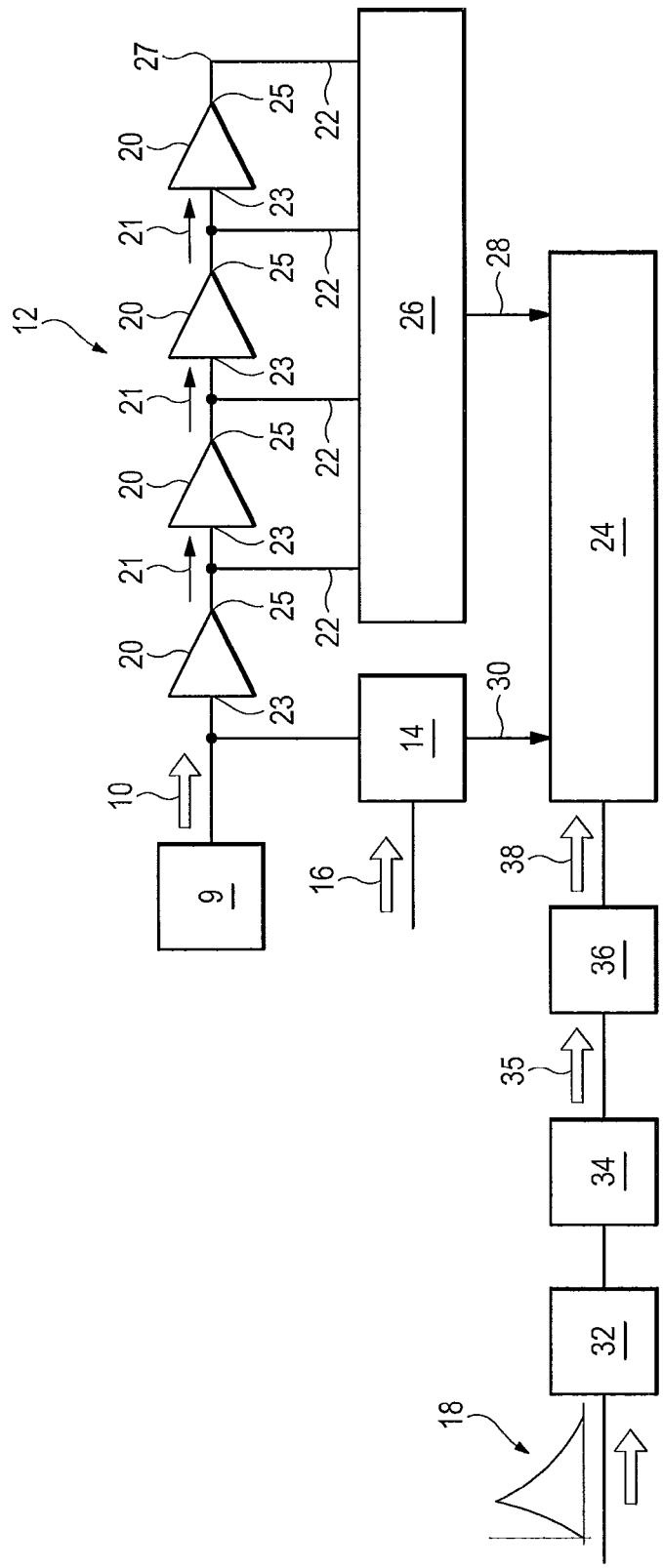
FIG. 1 is a schematic diagram of a time-to-digital converter useful for time-over-threshold processing, and the circuits necessary to trigger it.

A Time-to-Digital Converter (TDC) which can record time intervals as a binary code is depicted in FIG. 1, comprising a counter 14 and a delay line 12. The same TDC may also be used to record a start time and a stop time as intervals calculated from an arbitrary "zero" time. The counter 14 is a free running counter that may be reset to zero at any time and is incremented by each clock transition 10. "Incrementing" may also include decrementing the counter 14 from a non-zero value if that is advantageous. The counter 14 is reset and restarted by the reset signal 16. In a laser radar application, the transmission of the laser pulse preferably triggers or is otherwise temporally related to the reset signal 16.

The delay line 12 comprises a series of units 20, each of which transmits a signal 21 from a input 23 to an output 25 with a known small delay. The propagation is begun by the clock transition 10, and the line is chosen to be such a length that it takes exactly one clock cycle to propagate to the terminus 27. Taps 22 placed along the delay line 12 permit the TDC to determine where the signal 21 is in its propagation. Thus, the clock cycle is subdivided into a series of intervals determined by the number of units 20 in the delay line 12. In real circuits, the delay between each element of the delay line 12 may be subject to variation, both because of manufacturing inconsistencies and environmental factors such as temperature and power supply voltage. For this reason, calibration of individual TDC circuits may be necessary for maximum accuracy.

A latch 24 is used to capture the coarse and fine timing measurements. The counter output 30 comprises the most significant bits. An encoder 26 accepts the delay line 12 output. Then, given the number of units 20 in the delay line 12 and the position of the delay line signal 21, it is a straightforward matter to calculate the least significant bits for the fine portion of the timing measurement. A lookup table within encoder 26 may be used to speed this calculation. When combined, the counter output 30 and the encoder output 28 constitute a time stamp. In a preferred embodiment, this stamp is comprised of 32 bits, but it may have as many or as few as are appropriate. Knowing the clock frequency, it is then a straightforward matter to convert the latched values into whatever units are preferred for further processing.

In operation, when a pulse is sent out of a laser radar unit, the reset signal 16 is sent to the counter 14 to set it to zero and begin the timing measurement. When a reflected pulse 18 comes in and is detected by a photodetector 32, it passes through conventional signal processing equipment 34 to remove noise and amplify the target portions of the reflected pulse 18. This generates a conditioned pulse 35, which may then be passed to a discriminator 36 to determine when its level crosses a predetermined threshold. As used in this application, "discriminator" may refer to conventional comparators, constant fraction discriminators, or any other device that can determine when the level of the conditioned pulse 35 crosses a predetermined threshold. Preferably, conditioned pulse 35 is an electrical pulse for ease of processing. In one embodiment, a charge-sensitive amplifier is attached to the output of the photodetector 32 to provide the conditioned pulse 35 in the form of a voltage for the discriminator 36. It should be noted that photodetector 32 may comprise multiple optically active elements arranged in an array (not shown). This permits characterization of reflected pulse 18 in space as well as time. In this case, a plurality of conditioned pulses 35 will be created, for detection by a plurality of discriminators 36 and recording by a plurality of TDC's.

For a TOT measurement to be made, it is necessary to either record a first time when the reflected pulse 18 rises above a threshold, and then a second time when it falls below the threshold, and then subtract one from the other, or to begin counting at the first time and stop counting at the second time.

When the discriminator 36 determines that the level of the conditioned pulse 35 has exceeded the threshold, it sends a notification signal 38 to the TDC circuit. This activates the latch 24, which records the outputs of the counter 14 and the encoder 26. This first time is then calculated as described above, and may be recorded by conventional means in memory for further processing. The same process may occur on a second channel to record the second time, when the level of the conditioned pulse 35 falls below the threshold. If the channel may be read quickly enough and the latch 24 reset, it is possible to record both times on the same channel, but for conditioned pulses that change rapidly, two is more reliable. These channels may share the counter 14, delay line 12, and encoder 26, using different latches, or they may each have their own circuitry.

The difference between the first and second times is the time over threshold.

Figure 2:
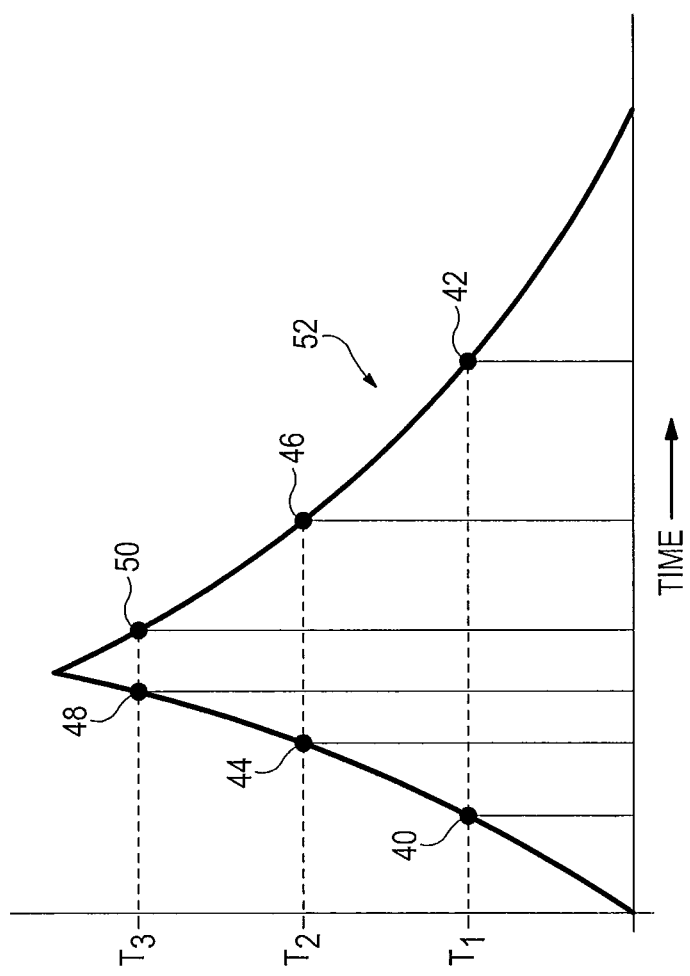
FIG. 2 is a representation of a pulse with time-over-threshold measurements superimposed over it.

Referring to FIG. 2, in applications where the pulse 52 itself is to be studied without reference to a transmitted pulse, the reset signal 16 may come from the discriminator 36 when the leading edge of the pulse 52 is detected. The notification signal 38 also comes from the discriminator 36, but in this case it indicates that the pulse 52 has fallen below the threshold. The TDC then measures only the time from the leading edge of the pulse 52 to the trailing edge. The leading edge may be considered to be any of the points 40, 44, or 48, depending on what threshold T1, T2, or T3 is being used by the TDC channel, while the trailing edge is the corresponding point 42, 46, or 50. In this mode, the TDC measures the time over threshold directly and no subtraction is required.

Multiple channels may also be employed with different thresholds T1, T2, T3 for each channel, each threshold corresponding to a pair of points (40 and 42, 44 and 46, and 48 and 50), as shown in FIG. 2. In this way a more complete picture of the pulse 52 is built. If all six points 40, 42, 44, 46, 48 and 50 are collected, a very accurate estimate of the total amplitude is possible. In one embodiment, the reset pulse 16 is triggered when the pulse 52 reaches point 40, and the counter 14 continues to run while points 44, 48, 50, 46 and 42 arrive in turn. In this way the shape of pulse 52 is recorded. In another embodiment, the reset pulse 16 corresponds to the transmission of a pulse, as in a laser radar application. This method permits both a measurement of time of flight and a view of the shape of the reflected pulse. The use of TOT techniques means that only the most useful data points are collected, while large numbers of intermediate points, and points covering time periods when no pulse 52 is present, are omitted. This greatly reduces the bandwidth and storage capacity required to characterize the pulse 52.

It is also possible to design a TDC which uses different thresholds for the leading edge and the falling edge of the pulse 52.

A tapped delay line is not the only possible architecture for improving timing resolution. A delay locked loop may also be implemented by comparing the phase of signal 21 at the terminus 27 to the phase of the clock transition 10 using a phase comparator. The delays of each delay unit 20 can then be adjusted so that the phase of the signal 21 at any point is held in a fixed and known relationship to the phase of the clock transition 10. The use of this feedback mechanism "locks" the delay line 12 to the clock generator 9, which helps to eliminate uncertainty and variability that might otherwise occur. The encoder 26 may then use combinatorial logic rather than a lookup table to compute the fine timing measurement. A delay locked loop may also employ a plurality of delay lines to generate a plurality of phase delays. In some embodiments, a single delay line may branch outward into several delay lines.

The terms and expressions that have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

I claim:

1. A method of measuring the duration of a time interval between a starting event and an ending event, the method comprising the steps of:
   a. receiving a periodic sequence of clock transitions at an input of a first delay unit of plural delay units connected in series, each delay unit having an input and an output, the input of each subsequent delay unit connected to the output of a previous delay unit, a clock transition occurring at the output of each delay unit at a fixed delay after the receipt of the clock transition at the input of that delay unit;
   b. commencing counting clock transitions received at the input of the first delay unit in response to the starting event; and
   c. latching a count of clock transitions received at the input of the first delay unit and respective outputs of plural delay units in response to the ending event.

2. The method of claim 1 further comprising the step of comparing a pulse level to a predetermined threshold, and wherein the ending event comprises the arrival of the pulse level at the threshold.

3. The method of claim 2 comprising comparing the pulse level to a plurality of thresholds, wherein said latching occurs repeatedly for a plurality of ending events corresponding to the arrival of the pulse level at said thresholds respectively.

4. The method of claim 2 wherein the starting event comprises the arrival of the pulse level at the threshold while rising, and the ending event comprises the arrival of the pulse level at the threshold while falling.

5. The method of claim 2 further comprising the step of measuring an external condition and generating the pulse level in response to the measurement.

6. The method of claim 1 further comprising the step of calculating a duration of time from the outputs of plural delay units.

7. The method of claim 1 wherein step c. comprises latching the count of clock transitions received at the input of the first delay unit and the outputs of the delay units in response to a first ending event and measuring a first time interval, and the method further comprises the steps of:
   d. latching another count of clock transitions received at the input of the first delay unit and other outputs of plural delay units in response to a second ending event and measuring a second time interval; and
   e. computing a difference between the first time interval and the second time interval.

8. The method of claim 7 further comprising the step of comparing a pulse level to a predetermined threshold, wherein the first ending event comprises the arrival of the pulse level at the threshold while rising, and the second ending event comprises the arrival of the pulse level at the threshold while falling.

9. The method of claim 8 comprising comparing the pulse level to a plurality of predetermined thresholds, and latching the count of received clock transitions and the output of the delay units in response to a plurality of ending events, said ending events forming pairs, each of said pairs of ending events corresponding to exactly one of the thresholds, wherein a first ending event of each pair comprises the arrival of the pulse level at the corresponding threshold while rising, and a second ending event of each pair comprises the arrival of the pulse level at the corresponding threshold while falling.

10. The method of claim 1 wherein the starting event is temporally related to a transmission of a pulse of light.

11. The method of claim 10 where in the ending event is temporally related to a return of the pulse of light after reflection from an object.

12. A device for measuring the duration of a time interval between a starting event and an ending event, the device comprising:
   a. a clock generator for generating a clock signal having a periodic sequence of clock transitions;
   b. a plurality of delay units connected in series, each delay unit having an input and an output, the input of a first delay unit arranged to receive clock transitions of the clock signal generated by the clock generator and the input of each subsequent delay unit connected to the output of a previous delay unit, a clock transition occurring at the output of each delay unit at a fixed delay after receipt of the clock transition at the input of that delay unit;
   c. a counter connected to receive the clock signal generated by the clock generator and, responsive to the starting event, to count clock transitions received at the input of the first delay unit; and
   d. a latch responsive to the ending event to latch a count of clock transitions received at the input of the first delay unit and respective outputs of plural delay units.

13. The device of claim 12 further comprising a sensor that produces an electrical pulse in response to a condition external to the device.

14. The device of 13 further comprising a discriminator capable of comparing a level of the electrical pulse to a predetermined threshold.

15. The device of claim 14 wherein the discriminator is connected to the latch to notify the latch of the occurrence of the ending event.

16. The device of claim 14 wherein the discriminator is connected to the counter to notify the counter of the starting event.

17. The device of claim 14, comprising a plurality of discriminators, each of said discriminators comparing the level of the electrical pulse to a different predetermined threshold.

18. The device of claim 17 comprising a plurality of latches capable of recording a plurality of ending events.

19. The device of claim 13 wherein said sensor is an optical sensor responsive to an optical condition external to the device, said sensor comprising at least one optically active element.

20. The device of claim 19 comprising a plurality of optically active elements.

21. The device of claim 12 comprising a plurality of delay lines.

\* \* \* \* \*